H. S. FOLKER AND D. M. BIDSTRUP.
MEANS FOR CONTROLLING THE OPERATIVE FIELD OF MAGNETS.
APPLICATION FILED FEB. 24, 1919.
1,334,531. Patented Mar. 23, 1920.
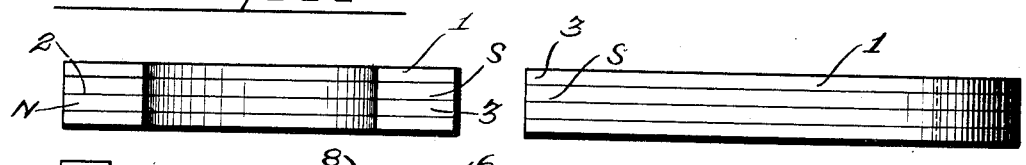
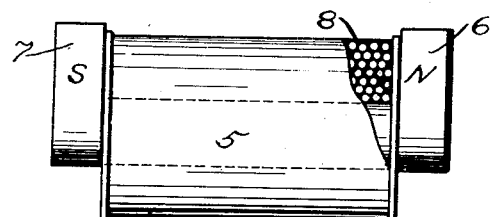
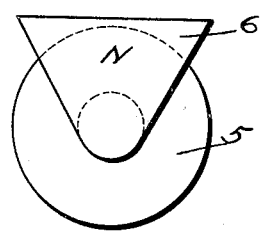
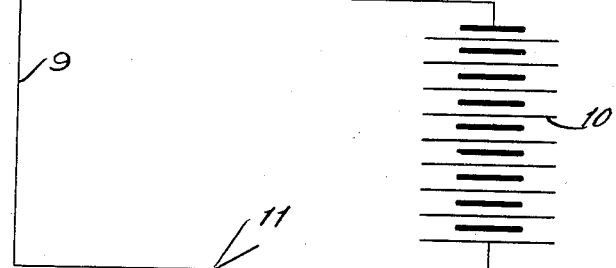
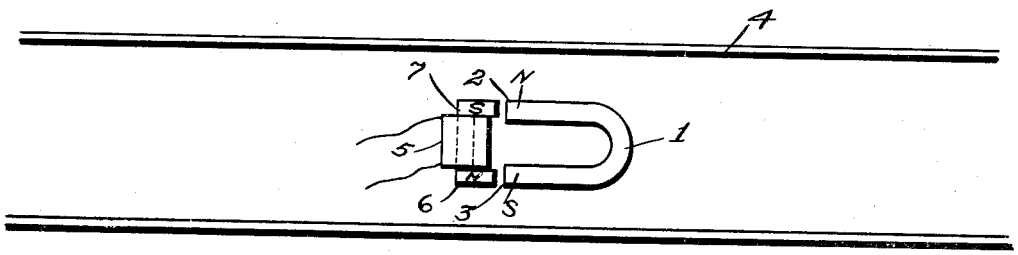

UNITED STATES PATENT OFFICE.

HOWARD S. FOLKER, OF MILL VALLEY, AND DANIEL M. BIDSTRUP, OF OROVILLE, CALIFORNIA, ASSIGNORS TO NATIONAL SAFETY APPLIANCE COMPANY, OF SAN FRANCISCO, CALIFORNIA, A CORPORATION OF CALIFORNIA.

MEANS FOR CONTROLLING THE OPERATIVE FIELD OF MAGNETS.

1,334,531.  Specification of Letters Patent.  Patented Mar. 23, 1920.

Application filed February 24, 1919. Serial No. 278,564.

*To all whom it may concern:*

Be it known that we, HOWARD S. FOLKER and DANIEL M. BIDSTRUP, citizens of the United States, the said FOLKER residing at Mill Valley, in the county of Marin and State of California, and the said BIDSTRUP at Oroville, Butte county, State of California, have invented certain new and useful Improvements in Means for Controlling the Operative Field of Magnets, of which the following is a specification.

The present invention relates to a means for varying the normal operating field of a permanent magnet, and is an improvement in that construction set forth in co-pending application Serial Number 223,281, filed March 19, 1918.

By the present invention movable means for controlling the magnetic field of a permanent magnet is dispensed with and a fixed means is provided, whereby all moving parts associated with the magnet are eliminated and a suitable solenoid or electro-magnet is positioned adjacent the poles of the permanent magnet with its poles reversed to the poles of the permanent magnet to provide, when energized, a means for deflecting the field of the permanent magnet, and during such deflection restoring the magnetism of said permanent magnet which has leaked or escaped therefrom, due to the fact that the poles of said permanent magnet are not connected.

The present invention has for its principal objects to dispense with the movable keeper now universally in use in connection with permanent magnets and to provide a construction particularly designed for railway signal work. However the same may be used generally where a magnet of the permanent type is needed.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in end elevation, partly broken away of the preferred embodiment of our invention.

Fig. 2 is a view in side elevation disclosing the solenoid positioned below the poles of the magnet and extending across the same.

Fig. 3 is a view in plan of an installation of our invention in connection with a railway track system, the solenoid in this view being in spaced relation beyond the ends of the permanent magnet.

Referring more particularly to the views of the drawings, wherein like characters of reference designate corresponding parts, 1 indicates a permanent magnet, preferably of the laminated form, the respective north and south poles 2 and 3 of which are arranged transversely of the track system 4, Fig. 3 of the drawings.

Positioned adjacent the poles 2 and 3 of the magnet 1 and extending across the same, either below the poles, as in Fig. 2, or beyond the ends thereof, as in Fig. 3, is a suitable solenoid or electro-magnet 5, the respective north and south poles 6 and 7 of which are reversed to the poles 2 and 3 of the magnet 1, as clearly illustrated in Fig. 1 of the drawings.

It is preferred that the solenoid 5 be of greater magnetic strength than the magnet 1, and this magnetic strength, as set forth in Fig. 1 of the drawings, is dependent on the number of windings 8 of the solenoid 5. The solenoid is connected with a circuit 9 in which is positioned a battery 10 and controlling switch 11, the operation of said switch energizing the solenoid, which being of greater strength than the magnet 1 draws the magnetic force of the poles of the magnet 1 below the same, thus varying the normal operative field of the magnet.

In Fig. 3 this circuit 9 may be through the tracks 4, and in that case the car wheels and axles operating over the tracks will provide the switch for controlling the circuit.

It is preferred that the circuit 9 be normally open, and in this case the operative field of the magnet 1 surrounds the poles thereof. However, the operation or energizing of the solenoid 5 causes the operative field of the magnet 1 to be distorted. The solenoid or electro-magnet 5 being more powerful than the magnet 1, restores the magnetism of said magnet 1 during the short time that the solenoid is energized; thus the momentary and intermittent energizing of the member 5 re-supplies the magnetism to the member 1, which is lost during such time as the member 5 is deënergized.

While the field distorting means mentioned throughout the specification refers to a solenoid, it is to be understood that any type of polarized magnetic member constructed with or without a core may be employed, just so long as the same is capable when energized of distorting the field of the permanent magnet.

Having thus described our invention, what we claim as new and desire to protect by Letters Patent is:—

1. In combination with a permanent magnet, an electro-magnet positioned mainly outside the field of said permanent magnet, and means for energizing said electro-magnet to set up a magnetic field of sufficient strength to distort the field of said permanent magnet and to cause the greater portion of the flux of said permanent magnet to pass through said means.

2. In combination with a permanent magnet, an armature extending across and spaced from the poles of said magnet, said armature lying mainly outside the field of said magnet, a coil surrounding said armature, and means for passing an electric current through said coil to set up a magnetic field of sufficient strength to cause the greater portion of the flux of said permanent magnet to pass through said armature.

3. In combination with a permanent magnet, an electro-magnet forming an armature for said permanent magnet, said electro-magnet being separated by an air gap from said permanent magnet and lying mainly outside the field thereof, and means for energizing said electro-magnet to break down said air gap and cause the flux of said permanent magnet to pass through said armature.

4. In combination with a permanent magnet, an electro-magnet having its poles separated by an air gap from the poles of said permanent magnet and lying mainly outside the field of said permanent magnet, and means for energizing said electro-magnet to break down said air gap and form a substantially closed magnetic circuit for the magnetic flux of both said magnets.

5. In combination with a permanent magnet, a polarized electro-magnet positioned mainly outside the magnetic field of said permanent magnet, the north pole of said electro-magnet being adjacent the south pole of said permanent magnet and the south pole of said electro-magent being adjacent the north pole of said permanent magnet, and means for energizing said electro-magnet to cause its field to pass through said permanent magnet and to distort the normal field thereof.

In testimony whereof we have signed our names to this specification in the presence of two subscribing witnesses.

HOWARD S. FOLKER.
DANIEL M. BIDSTRUP.

Witnesses:
   HARRY A. TOTTEN,
   D. B. RICHARDS.